W. H. ELLIOT.
Revolver.
No. 1,715 Reissued July 5, 1864.
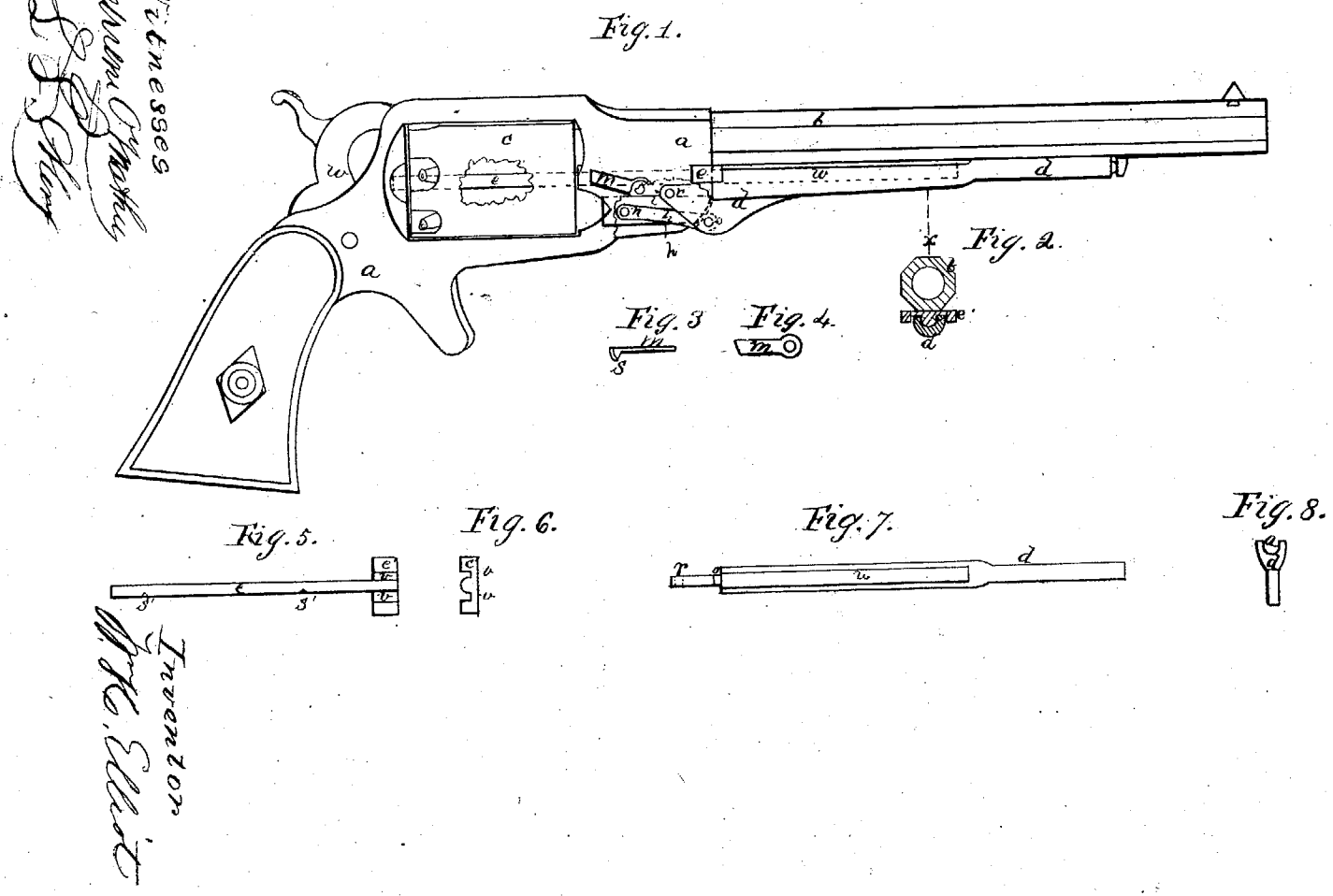
Witnesses
Adrien Cynathy
L. S. Merry
Inventor
W. H. Elliot
N. PETERS, PHOTO-LITHOGRAPHER, WASHINGTON, D. C.

UNITED STATES PATENT OFFICE.

WM. H. ELLIOT, OF PLATTSBURG, NEW YORK.

IMPROVEMENT IN THE BASE-PIN AND LEVER OF REVOLVING FIRE-ARMS.

Specification forming part of Letters Patent No. 2,928, dated December 17, 1861; Reissue No. 1,715, dated July 5, 1864.

*To all whom it may concern:*

Be it known that I, W. H. ELLIOT, of Plattsburg, in the county of Clinton and State of New York, have invented a new and Improved Mode of Constructing and Arranging the Base-Pin and Lever of Revolving Pistols; and I do hereby declare that the following is a full and exact description thereof, reference being had to the drawings accompanying the same and the letters of reference marked thereon, similar letters indicating the same parts in all the figures, in which—

Figure 1 represents a side view of my improved pistol. Fig. 2 represents a transverse section through the same at the line *x* of Fig. 1, and showing the base-pin drawn out. Fig. 3 represents a friction-spring for holding the base-pin. Fig. 4 represents another view of the spring. Fig. 5 represents a side view of the base-pin. Fig. 6 represents a section through the head of the base-pin. Fig. 7 represents a side view of the lever, and Fig. 8 represents a section through the same.

The nature of my invention consists, first, in so combining the base-pin and lever of a revolving pistol, when arranged centrally below the barrel, as that the base-pin may be drawn in a forward direction to release the cylinder without displacing the lever; and it further consists in providing a groove in the lever, so as to afford space for the reception of the base-pin as it is passed forward out of the cylinder; and it further consists in cutting away the projecting portions of the head of the base-pin when the head so cut away is used in connection with a grooved lever, for a purpose that will be explained.

To enable others skilled in the art to make and use my invention, I will proceed to describe the same with reference to the drawings.

*a* represents the frame of the pistol, and *b* the barrel, and *c* the cylinder thereof, which latter is held in place by the base-pin *e*, upon which the cylinder is revolved.

*d* is a lever pivoted to the frame *a*, and to this lever is pivoted, by means of a link, *h*, the plunger *i* for ramming down the charges in the several chambers of the cylinder. These several hinged or pivoted connections are shown at *r n o*.

*m* is a friction-spring having a projection, *s*, upon its free end, which is designed to take into the notches *s'* of the base-pin to hold it at certain positions when necessary.

*u* is a groove cut in the back of the lever *d* to receive the base-pin *e* and to admit of its being drawn in a forward direction to release the cylinder. The head *e'* of the base-pin is cut away at *v v*, so that said head may be sufficiently large to be easily caught by the fingers to move it, and yet admit of a compact connection or arrangement of lever and base-pin.

The hammer *w* of the pistol is located in the center of the frame at the rear and in the line of the barrel.

When the base-pin is drawn in a forward direction for the purpose of removing the cylinder from the frame it occupies the groove *u* in the back of the loading-lever *d*, and its head *e'* projects out at each side, the thin portions *v* thereof occupying the narrow space between the barrel *b* and the lever *d*. The head *e'* of the base-pin *e* is made thicker at its extremities, so as to afford a more certain hold for the thumb and finger in handling it. In providing space between the lever and barrel for the base-pin to move in, it is unnecessary to disturb the lever when the cylinder is being removed from the frame. By this arrangement, too, all the difficulties that arise from a displacing of other parts of the pistol when it is only necessary to removed the cylinder are obviated.

In pistols having side locks the base-pin may be drawn out of the rear to remove the cylinder, and my invention would not have to be used; but I retain the advantage of placing the hammer in the center of the frame behind the cylinder, and so arrange that the base-pin can be drawn in a forward direction to release the cylinder without first displacing the lever or removing any portion of the frame.

By providing a groove in the side of the lever next to the barrel for the reception of the base-pin the form and symmetry of the pistol are at least unimpaired, while the strength of the lever compared with its weight is increased or not diminished. Without a groove either in the lever or barrel for the reception of the base-pin the advantages of removing the cylinder by drawing forward the base-pin without displacing other parts of the pistol could not be obtained without leaving an open space between the lever and barrel equal to the diameter of the base-pin, which would render the pistol less compact and also seriously injure its appearance.

Having thus fully described my invention, what I claim therein is—

1. So combining the base-pin and lever of a revolving pistol, when arranged centrally below the barrel, as that the base-pin may be drawn in a forward direction to release the cylinder without displacing the lever, substantially as described.

2. Providing a groove, *u*, in the lever *d*, so as to afford space for the reception of the base-pin *e* as it is passed forward out of the cylinder, as and for the purpose herein specified.

3. Cutting away the projecting portions of the head of the base-pin, as represented at *v v*, when the base-pin so formed is employed with a grooved lever, *d*, as and for the purpose set forth.

W. H. ELLIOT.

Witnesses:
A. B. STOUGHTON,
XAVER. FENDRICH.